United States Patent
Koudal et al.

(10) Patent No.: US 11,783,346 B2
(45) Date of Patent: Oct. 10, 2023

(54) BLOCKCHAIN ENABLED COLLABORATIVE TRANSACTION INFORMATION PROCESSING FOR A SUPPLY CHAIN

(71) Applicant: General Electric Company, Schenectady, NY (US)

(72) Inventors: Peter Koudal, Niskayuna, NY (US); Benjamin Edward Beckmann, Niskayuna, NY (US); Annarita Giani, Niskayuna, NY (US); John William Carbone, Niskayuna, NY (US); Joseph Salvo, Schenectady, NY (US); Junrong Yan, Niskayuna, NY (US); Dan Yang, Niskayuna, NY (US); Patricia MacKenzie, Clifton Park, NY (US); Walter Yund, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 81 days.

(21) Appl. No.: 16/641,188

(22) PCT Filed: Aug. 31, 2017

(86) PCT No.: PCT/US2017/049695
§ 371 (c)(1),
(2) Date: Feb. 21, 2020

(87) PCT Pub. No.: WO2019/045739
PCT Pub. Date: Mar. 7, 2019

(65) Prior Publication Data
US 2021/0158370 A1 May 27, 2021

(51) Int. Cl.
*G06Q 30/018* (2023.01)
*B33Y 30/00* (2015.01)
(Continued)

(52) U.S. Cl.
CPC ............ *G06Q 30/018* (2013.01); *B33Y 30/00* (2014.12); *B33Y 50/02* (2014.12);
(Continued)

(58) Field of Classification Search
None
See application file for complete search history.

(56) References Cited

U.S. PATENT DOCUMENTS

| 8,640,205 B2 | 1/2014 | Weaver |
| 9,608,829 B2 | 3/2017 | Spanos et al. |

(Continued)

FOREIGN PATENT DOCUMENTS

| CN | 106981004 A | 7/2017 |
| CN | 107103480 A | 8/2017 |

(Continued)

OTHER PUBLICATIONS

Yao, Sheng; "Research on the Model of Collaborative ERP Based on GDSS", 2008 International Conference on Information Management, Innovation Management and Industrial Engineering, pp. 124-128, 2008.

(Continued)

*Primary Examiner* — Jan P Mincarelli
(74) *Attorney, Agent, or Firm* — Fletcher Yoder P.C.

(57) ABSTRACT

According to some embodiments, a system may facilitate collaborative transaction processing associated with a supply chain having a first entity and a second entity. In particular, a first entity database may store electronic records including information associated with at least a portion of the supply chain, and a first entity communication port may exchange information via a distributed computer system. A first entity computer processor may retrieve from the first entity database the information associated with the at least a portion of the supply chain. A subset of information about (Continued)

the supply chain may be identified by the first entity computer processor as being of interest to the second entity. The identified subset of information about the supply chain may then be recorded via a secure, distributed transaction ledger.

21 Claims, 15 Drawing Sheets

(51) Int. Cl.
*B33Y 50/02* (2015.01)
*G06F 16/23* (2019.01)
*G06Q 50/28* (2012.01)
*G06Q 50/04* (2012.01)

(52) U.S. Cl.
CPC ......... *G06F 16/2379* (2019.01); *G06Q 50/28* (2013.01); *G06Q 50/04* (2013.01)

(56) References Cited

U.S. PATENT DOCUMENTS

| | | |
|---|---|---|
| 2013/0030878 A1 | 1/2013 | Weaver |
| 2015/0379510 A1 | 12/2015 | Smith |
| 2016/0098730 A1 | 4/2016 | Feeney |
| 2016/0253622 A1 | 9/2016 | Sriram et al. |
| 2016/0261404 A1 | 9/2016 | Ford et al. |
| 2016/0284033 A1 | 9/2016 | Winand |
| 2017/0013047 A1 | 1/2017 | Hubbard et al. |
| 2017/0041296 A1 | 2/2017 | Ford et al. |
| 2017/0083860 A1 | 3/2017 | Sriram et al. |
| 2017/0228742 A1 | 8/2017 | Aljawhari |
| 2017/0236143 A1 | 8/2017 | Code et al. |
| 2017/0243193 A1 | 8/2017 | Manian et al. |
| 2017/0307387 A1* | 10/2017 | Kohlhepp .......... G05B 19/4155 |
| 2018/0012311 A1* | 1/2018 | Small .................... G06Q 50/04 |
| 2018/0069899 A1* | 3/2018 | Lang ........................ G06F 8/38 |
| 2018/0144298 A1* | 5/2018 | Rankin .................... H04L 9/34 |
| 2018/0341910 A1* | 11/2018 | Broveleit ............... G06Q 50/28 |

FOREIGN PATENT DOCUMENTS

| | | | |
|---|---|---|---|
| JP | 2007179324 A | | 7/2007 |
| JP | 2008139954 A | | 6/2008 |
| KR | 1020140029866 | | 3/2014 |
| WO | 2016138447 A1 | | 9/2016 |
| WO | 2016170538 A1 | | 10/2016 |
| WO | 2017027648 A1 | | 2/2017 |
| WO | 2017083517 A1 | | 5/2017 |

OTHER PUBLICATIONS

Seppala, Jane; "The role of trust in understanding the effects of blockchain on business models", Aalto university school of science, pp. 55+3, Oct. 26, 2016.

International Search Report/Written Opinion; PCT/US2017/049695, dated Nov. 8, 2017; 12 pages.

Supplementary European Search Report, Application No. EP17923052; dated Dec. 11, 2020; 7 pages.

Korean Office Action; KR Application No. 10-2020-7008969; dated May 10, 2022.

Chinese Office Action; CN Application No. 201780094368.0; dated Feb. 23, 2023.

* cited by examiner

BLOCKCHAIN ENABLED COLLABORATIVE TRANSACTION INFORMATION PROCESSING FOR A SUPPLY CHAIN

BACKGROUND

Some embodiments disclosed herein relate to industrial assets and, more particularly, to blockchain enabled collaborative transaction information processing for a supply chain.

One type of business process management system relates to organizing supplies used by a business entity (e.g., a corporation) for manufacturing and delivering goods and/or services. The organization and management of supplies is often referred to as a "supply chain." A supply chain comprises a system of organizations, people, activities, information, actors, entities, and resources associated with the manufacture and delivery of a product or service from a supplier to a customer. Because a supply chain can encompass a complex set of resources from around the globe, a supply chain entity may have only a limited amount of knowledge regarding various other portions of the chain and a limited ability to respond to issues associated with the allocation of resources. An entity's failure to respond to risks and opportunities to drive cost reduction and revenue growth may have significant impact on an organization's ability to deliver a good or service and remain profitable.

For example, in a global economy, a supply chain entity may face challenges relating to allocating material globally, such as figuring out where to place inventory so it is best located for upcoming demand. Similarly, an entity which may experience defects in the supply chain which may not be immediately noticeable and may also be difficult to validate. To improve the exchange of information between various entities of a supply chain, a centralized system, managed by a trusted organization or consortium, might be implemented. These types of systems may require that critical business information either pass through or be stored at a location that is under the centralized system's control. In addition, a mechanism is required to establish user identity and this information is also commonly stored centrally. Because these types of systems are so centralized, they may be susceptible to multiple types of failures or attacks, such as concentrated and/or persistent cyber-attacks. It would therefore be desirable to provide systems and methods to efficiently and securely share information between supply chain entities.

SUMMARY

According to some embodiments, a system may facilitate collaborative transaction processing associated with a supply chain having a first entity and a second entity. In particular, a first entity database may store electronic records including information associated with at least a portion of the supply chain, and a first entity communication port may exchange information via a distributed computer system. A first entity computer processor may retrieve from the first entity database the information associated with the at least a portion of the supply chain. A subset of information about the supply chain may be identified by the first entity computer processor as being of interest to the second entity. The identified subset of information about the supply chain may then be recorded via a secure, distributed transaction ledger.

Some embodiments comprise: means for retrieving, by a first entity computer processor from a first entity database, information associated with at least a portion of the supply chain; means for identifying, by the first entity computer processor, a subset of information about the supply chain as being of interest to the second entity; and means for recording, by the first entity computer processor, the identified subset of information about the supply chain via a secure, distributed transaction ledger.

Technical effects of some embodiments of the invention are improved ways to efficiently and securely share information between supply chain entities. With these and other advantages and features that will become hereinafter apparent, a more complete understanding of the nature of the invention can be obtained by referring to the following detailed description and to the drawings appended hereto.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
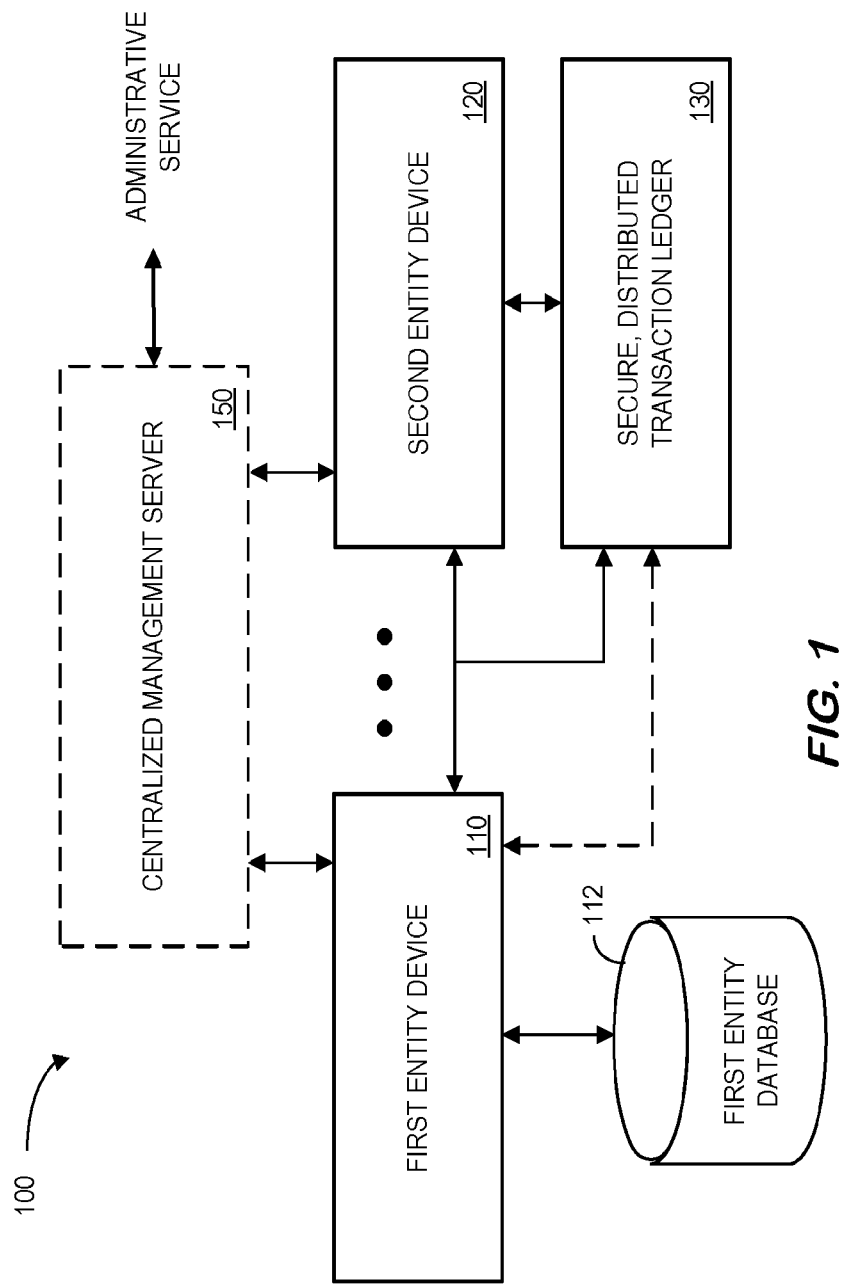
FIG. 1 is a high-level block diagram of a system according to some embodiments.

It may generally be desirable to efficiently and securely share information between supply chain entities. As used herein, the phrase "supply chain" might be associated with, for example, a sequence of processes and/or entities involved in a production and/or distribution of a commodity (such as an industrial asset component or part). FIG. 1 is a high-level block diagram of a system 100 according to some embodiments. In particular, the system 100 includes a first entity device 110 with a communication port to exchange information with a second entity device 120 and/or a centralized management server 150. The first entity device 110 might include and/or be associated with a first entity database 112 (e.g., storing information about a supply chain). The first entity device 110 and/or other elements of the system may then record information about the transaction using a secure, distributed transaction ledger 130 (e.g., via a blockchain verification process). For example, the first entity device 110 might record one or more of an order date and time, a price, an industrial asset item location, or the like. via the secure, distributed transaction ledger 130 in accordance with any of the embodiments described herein. According to some embodiments, the distributed ledger might be associated with the HYPERLEDGER® blockchain verification system. Note that the first entity device 110 could be completely de-centralized and/or might be associated with a third party, such as a vendor that performs a service for an enterprise.

The first entity device 110 and/or second entity device 120 might be, for example, associated with a Personal Computer ("PC"), laptop computer, a tablet computer, a smartphone, an enterprise server, a server farm, and/or a database or other storage devices. According to some embodiments, an "automated" first entity device 110 may automatically exchange supply chain information with the second entity device via a blockchain verification process. As used herein, the term "automated" may refer to, for example, actions that can be performed with little (or no) intervention by a human.

As used herein, devices, including those associated with the first entity device 110 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The first entity device 110 may store information into and/or retrieve information from data stores. The data stores might, for example, store electronic records representing prior transactions, transactions current in process, etc. The data stores may be locally stored or reside remote from the first entity device 110. Although a single first entity device 110 is shown in FIG. 1, any number of such devices may be included. Moreover, various devices described herein might be combined according to embodiments of the present invention. For example, in some embodiments, the first entity device 110, data stores, and/or other devices might be co-located and/or may comprise a single apparatus.

In some embodiments, the centralized management server 150 may be involved with the exchange of supply chain data between the first entity device 110 and the second entity device 120 and/or the secure, distributed transaction ledger. For example, an administrative service might provide information to help organize and/or format the exchange of information.

Figure 2:
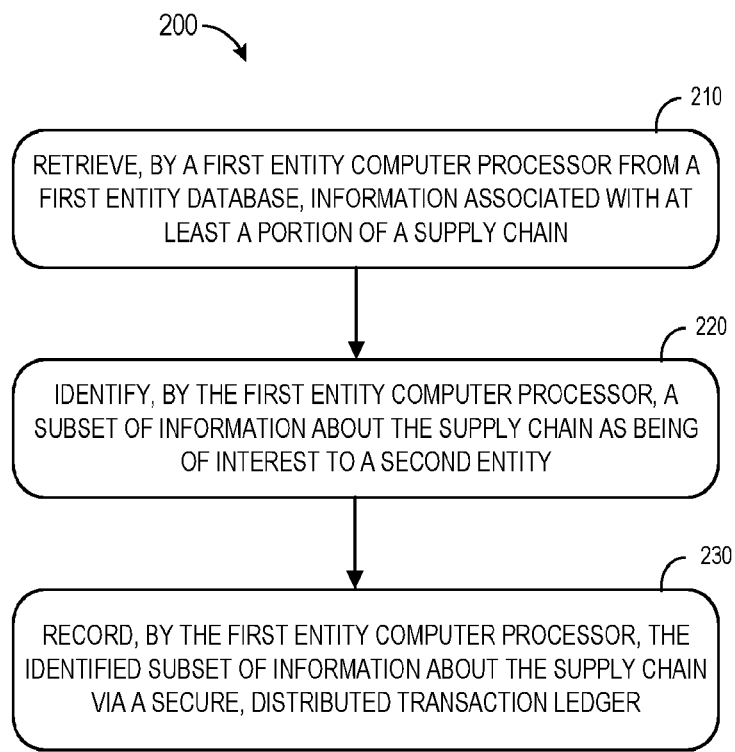
FIG. 2 is a method that may be associated with a first supply chain entity device in accordance with some embodiments.

Note that the system 100 of FIG. 1 is provided only as an example, and embodiments may be associated with additional elements or components. According to some embodiments, the elements of the system 100 provide blockchain enabled collaborative transaction information processing. For example, FIG. 2 illustrates a method 200 that might be performed by the first entity device 110 and/or other elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 210, a first entity computer processor may retrieve, from a first entity database, information associated with the at least a portion of the supply chain. As used herein, the phrase "supply chain" might refer to, for example, a local supply chain, an international supply chain, and/or a global supply chain. Moreover, the term "entity" might refer to an Original Equipment Manufacturer ("OEM") supplier, a logistics provider, a customer, etc. By way of example only, a supply chain and/or entity might be associated with an engine, an aircraft, a locomotive, power generation, a wind turbine, etc.

At 220, the first entity computer processor may identify a subset of information about the supply chain as being of interest to the second entity. The identified subset of information about the supply chain might be associated with, for example, quality information, delivery information, mission critical information, physical location data, product quality information, material quality information, inspection information, a price of a good, a price of a service, contractual commitment data, delivery conditions, and/or shipping information, etc. According to some embodiments, the subset of information about the supply chain might be identified by an operator or administrator (e.g., by selecting the subset from a list of potential subsets). According to other embodiments, the subset might be automatically determined by an application, such as an application designed to identify potentially critical points of a supply chain process.

At 230, the first entity computer processor may record the identified subset of information about the supply chain via a secure, distributed transaction ledger (e.g., using blockchain technology). Note that a blockchain ledger might be controlled by a single, centralized entity or multiple, distributed entities. According to some embodiments, the recorded subset of information about the supply chain is updated via the secure, distributed transaction ledger automatically on a periodic basis (e.g., a nightly basis) and/or upon a change in a pre-determined condition (e.g., when a product is shipped or inspected). In some cases, the information recorded in the secure, distributed transaction ledger may further include data about a specific geographic location (e.g., of a party associated with a transaction), data about a specific database, and/or data about a specific computer. According to some embodiments, the information record in the secure, distributed transaction ledger includes validation information provided by a trusted actor. In some cases, the validation information may be used to create a digital "fingerprint" that can be associated with a particular transaction or supply chain.

Figure 3:
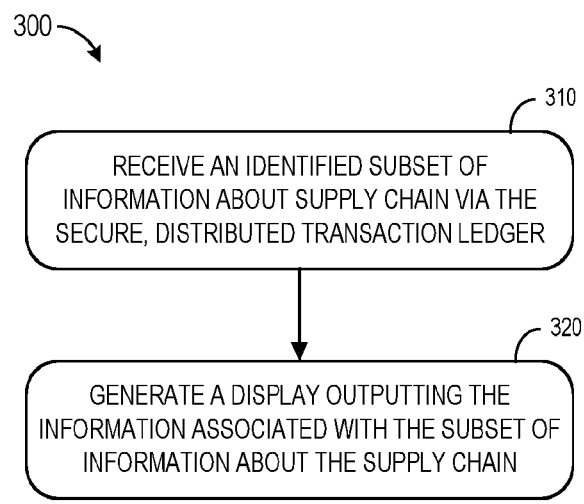
FIG. 3 is a method that may be associated with second supply chain entity device in accordance with some embodiments.

FIG. 3 is a method 300 that may be associated with the second entity device 120 of FIG. 1 in accordance with some embodiments. At 310, the second entity device may receive the identified subset of information about the supply chain via the secure, distributed transaction ledger. At 320, the second entity device may generate a display outputting the subset of information about the supply chain. The generated display might be associated with, for example, a personal computer, a tablet computer, a server computer, a smartphone, etc. Note that the first and/or second entity devices may be associated with a single network cloud-hosted topology, a multiple network cloud-hosted topology, or a participant hosted intranet environment.

Figure 4:
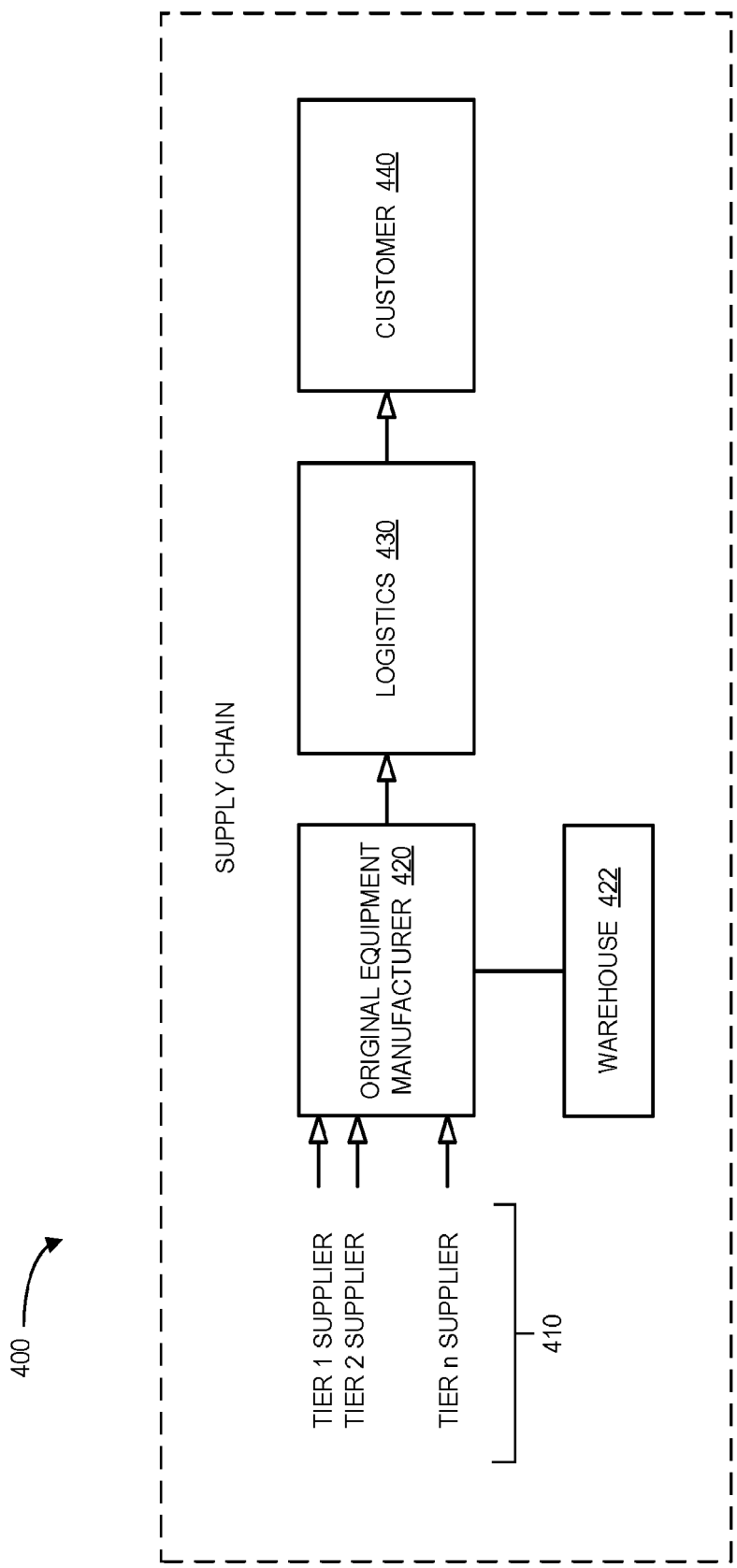
FIG. 4 illustrates elements of a supply chain in accordance with some embodiments.

Thus, embodiments may enable blockchain enabled collaborative transaction information processing and sharing in a globally distributed supply chain. As illustrated by the supply chain 400 of FIG. 4, business partners across a globally distributed, multi-echelon supply chain, including suppliers 410 (e.g., tier 1, 2 and n suppliers), an OEM 420 and associated warehouse 422, logistics providers 430, and customers 440—may utilize a trusted method and system to share private information across a business network. With dozens or hundreds of individual systems and smaller point solutions, companies may avoid manually handling critical business information with their partners. Enabled by a secure, distributed transaction ledger, such as one associated with block-chain technology, embodiments described herein may enable companies to confidently share and retrieve business critical information across a trusted network.

Through a distributed blockchain network controlled by one, few, or many participants (e.g., an industry consortium), a collaborative system across a local or global supply chain may enable companies and individuals to participate in a flexible and trustworthy system. For example, a supplier of components to an industrial customer might decide to share critical quality and delivery information on mission-critical parts for the customer. By participating in the network, both the supplier and customer may know that the information will be trustworthy. Moreover, the information might only be shared with the company and/or individual who need to know. Because the system can be configured to fit individual use cases, the need to sharing large chunks of data (when just a few data points are needed) may be reduced.

For information that is repetitive and/or needs to updated and shared on a regular basis, the system may be configured and connected to specific locations (e.g., associated with databases, computers, etc.) at network participant sites. Validation information, such as location data, database information, computer information, etc., might be automatically accessed and entered into the information chain (and validated if needed by a trusted human owner/sender of the information). According to some embodiments, this information may be used to create a "digital fingerprint" to be added to the information, thus increasing a user's level of trust.

Figure 5:
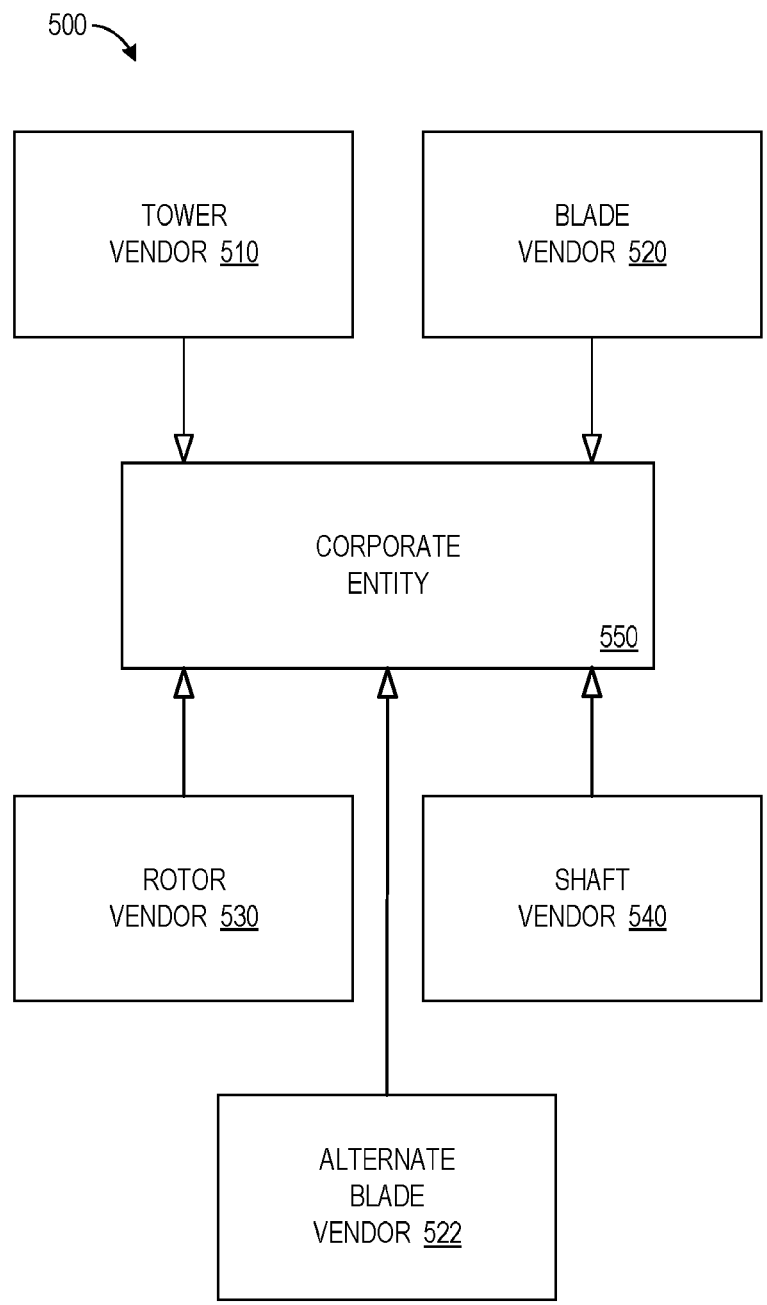
FIG. 5 is a representation of a supply chain according to some embodiments.

FIG. 5 is a representation of a supply chain 500 according to some embodiments. For illustrative purposes, and to aid in understanding features of the specification, an example will be introduced. This example is not intended to limit the scope of the claims. For example, corporation corporate entity 550, such as an international corporation, may manufacture and sell wind turbines. Each wind turbine may comprise blades, a rotor, a tower and a shaft. For purposes of this example, each of these components may be manufactured by a different supplier and thus towers may be supplied from a tower vendor 510, blades may be supplied from a blade vendor 520 (or an alternate blade vendor 522), rotors from a rotor vendor 530, and shafts from a shaft vendor 540. Failure of any of the aforementioned suppliers may prevent wind turbines from being built and delivered in a timely manner. To help avoid such situations from occurring, embodiments may allow for a blockchain enabled exchange of supply chain information between entities and/or actors of the supply chain. An actor may comprise, but is not limited to, a vendor/supplier, a sourcing leader, a commodity leader, a sourcing executive, a finance analyst, a model analyst, a business analyst, a computer system or an attorney. The supply chain data that is exchanged might be associated with, for example, component data, such data associated with the goods that a supplier produces. As other examples, component data may relate to a supplier's production capabilities such as, but not limited to, a number of units a supplier can produce in a given time period, information about a supplier's delivery mechanism, facilities' capabilities, government restrictions imposed on the supplier such as, but not limited to, a workforce demographic or other legal requirement (e.g., a certain percentage of local citizens must be employed by the supplier), costs per unit of production, cost per unit for delivery, etc. Historical data regarding the plurality of vendors may also be exchanged between entities.

According to some embodiments, the blockchain enabled exchange of information between supply chain entities may be associated with a supplier Line Of Balance ("LOB") process. A LOB process may be associated with a repetitive process that exists within a contract's work scope and the manufacturing and assembly of parts in the factory. A LOB may comprise a management control process for collecting, measuring and presenting facts relating to time, cost and accomplishment which may all be measured against a specific plan.

In some embodiments, the blockchain enabled exchange of supply chain information may indicate that there is a high probability that each of the actors will timely deliver their respective goods or services. In some embodiments, an output of creating a LOB may illustrate a process, a status, a background, timing and phasing of the project activities, and thus the LOB may provide management with measuring tools to (i) compare actual progress with an objective plan, (ii) examine any deviations from the objective plan (as well as gauging their degree of severity with respect to the remainder of the project), (iii) indicate areas where appropriate corrective action is required and/or (iv) forecast future performance. The blockchain enabled exchange of supply chain information may also be associated with extra costs that will occur when an actor is not timely and potentially misses a delivery date. The blockchain enabled exchange of supply chain information may be associated with constraints such as if a supplier can't build his goods, the supplier can't ship his goods and there may be financial repercussions associated with missing a delivery date. Unlike manual methods, the present embodiments may automatically facilitate (e.g., a technical effect) the optimization of supply chain functionality as various actors change component data and/or when there is a change in the various actors.

Figure 6:
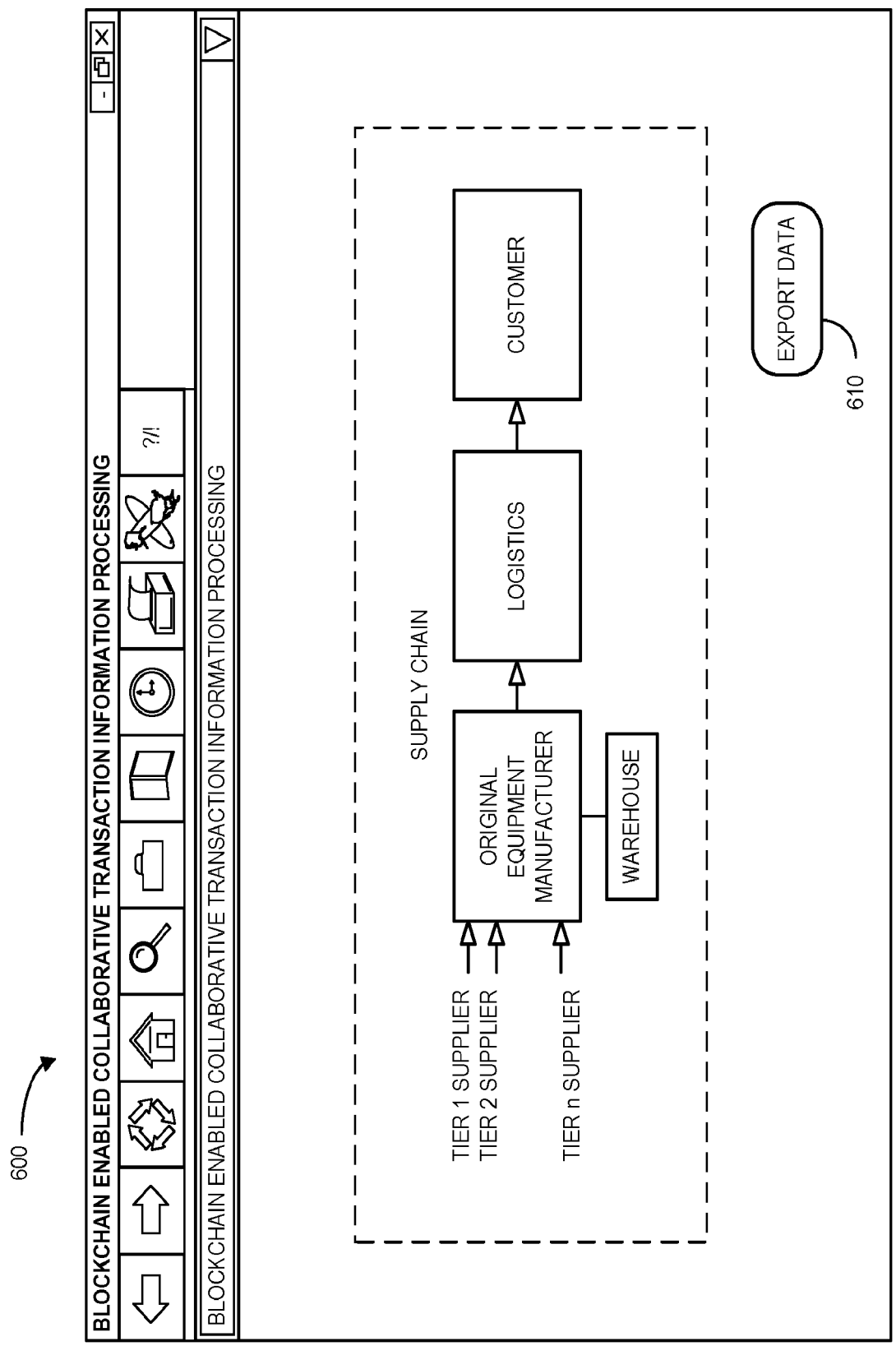
FIG. 6 illustrates a computer display in accordance with some embodiments.

FIG. 6 illustrates a computer display 600 in accordance with some embodiments. The display 600 includes a graphical representation of a supply chain such that a user may select elements of the supply chain (e.g., via a computer mouse or touchscreen) to see further information and/or adjust details about that element (e.g., via a pop-up window). According to some embodiments, the display 600 includes one or more selectable icons 610 that can be used to export or import data, save files, publish information, perform a blockchain validation, etc.

With dozens or hundreds of individual systems and smaller point solutions, companies would be left to manually handle critical business information with their hundreds or thousands of business partners. Enabled by block-chain technology, embodiments described herein may help companies share and retrieve business critical information across a trusted network. While focusing on the information sharing and processing, note that embodiments are not limited to any particular type of business data (e.g., the tracking of physical goods). Rather, embodiments may provide for the sharing of any critical business information across the global networks—including quality information of products and materials, prices of goods and services, contractual commitments, delivery conditions, shipping information, etc.

Figure 7:
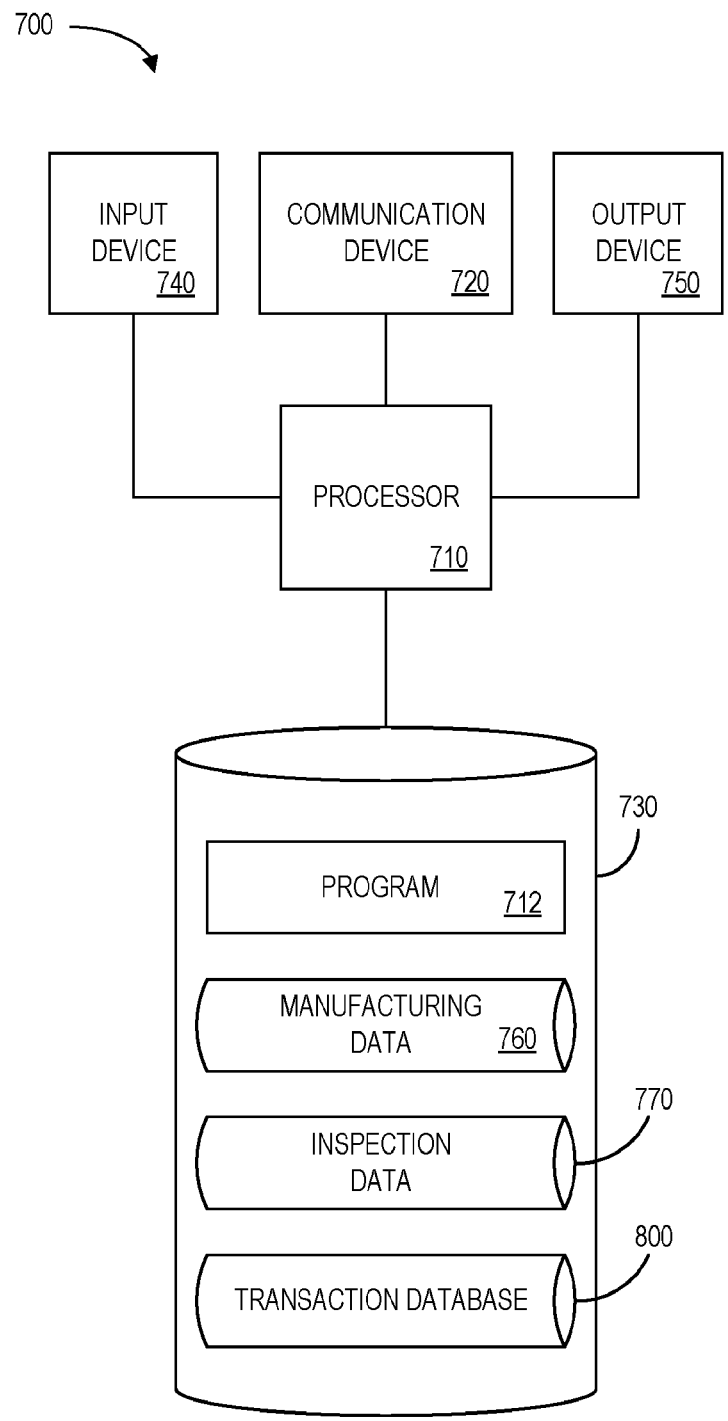
FIG. 7 illustrates a platform according to some embodiments.

Embodiments described herein may comprise a tool to help share information among supply chain entities and may be implemented using any number of different hardware configurations. For example, FIG. 7 illustrates a platform 700 that may be, for example, associated with the first entity device 110 of FIG. 1 (as well as other systems described herein). The platform 700 comprises a processor 710, such as one or more commercially available Central Processing Units ("CPUs") in the form of one-chip microprocessors, coupled to a communication device 720 configured to communicate via a communication network (not shown in FIG. 7). The communication device 720 may be used to communicate, for example, with one or more remote platforms and/or a ledger. Note that communications exchanged via the communication device 720 may utilize security features, such as those between a public internet user and an internal network of an insurance enterprise. The security features might be associated with, for example, web servers, firewalls, and/or Public Key Infrastructure ("PKI") devices. The platform 700 further includes an input device 740 (e.g., a mouse and/or keyboard to enter information about a distributed ledger, a business relationship, etc.) and an output device 750 (e.g., to output pedigree reports, generate production status alert messages, etc.).

The processor 710 also communicates with a storage device 730. The storage device 730 may comprise any appropriate information storage device, including combinations of magnetic storage devices (e.g., a hard disk drive), optical storage devices, mobile telephones, and/or semiconductor memory devices. The storage device 730 stores a collaborative program 712 for controlling the processor 710. The processor 710 performs instructions of the program 712, and thereby operates in accordance with any of the embodiments described herein. For example, the processor 710 may facilitate collaborative transaction processing associated with a supply chain having a first entity and a second entity. In particular, the processor 710 may store electronic records including information associated with at least a portion of the supply chain, and a first entity communication port may exchange information via a distributed computer system.

The processor 710 may also retrieve the information associated with the at least a portion of the supply chain. A subset of information about the supply chain may be identified by the processor 710 as being of interest to the second entity. The identified subset of information about the supply chain may then be recorded by the processor 710 via a secure, distributed transaction ledger.

The program 712 may be stored in a compressed, compiled, uncompiled and/or encrypted format. The program 712 may furthermore include other program elements, such as an operating system, a database management system, and/or device drivers used by the processor 710 to interface with peripheral devices.

As used herein, information may be "received" by or "transmitted" to, for example: (i) the platform 700 from another device; or (ii) a software application or module within the platform 700 from another software application, module, or any other source.

In some embodiments (such as shown in FIG. 7), the storage device 730 further stores manufacturing data 760, inspection data 770, and a transaction database 800. An example of a database that might be used in connection with the platform 700 will now be described in detail with respect to FIG. 8. Note that the database described herein is only an example, and additional and/or different information may be stored therein. Moreover, various databases might be split or combined in accordance with any of the embodiments described herein. For example, the transaction database 800 and inspection data 770 might be combined and/or linked to each other within the program 712.

Figure 8:
FIG. 8 is a portion of a tabular transaction database in accordance with some embodiments.

Referring to FIG. 8, a table is shown that represents the transaction database 800 that may be stored at the platform 700 in accordance with some embodiments. The table may include, for example, entries identifying transactions associated with the manufacture of items for customers. The table may also define fields 802, 804, 806, 808, 810, 812, 814 for each of the entries. The fields 802, 804, 806, 808, 810, 812, 814 may, according to some embodiments, specify: transaction identifier 802, a customer platform identifier 804, a date and time 806, a status 808, a blockchain result 810, data 812, and another platform identifier 814. The transaction database 800 may be created and updated, for example, based on information electrically received from remote customer platforms, additive or subtractive manufacturer platforms, and/or distributed ledger devices.

The transaction identifier 802 may be, for example, a unique alphanumeric code identifying a piece of supply chain information being shared between entities. The customer platform identifier 804 might identify one or more of the entities and the date and time 806 might indicate when the information was exchanged. The status 808 might indicate if the transfer of information is "in process," "pending," "complete," etc. The blockchain result 810 might indicate whether the information is verified via a distributed ledger while the data 812 might contain (or point to) the information that is being shared. The other platform identifier 814 might indicate, for example, a supplier or OED associated with the transaction.

Figure 9:
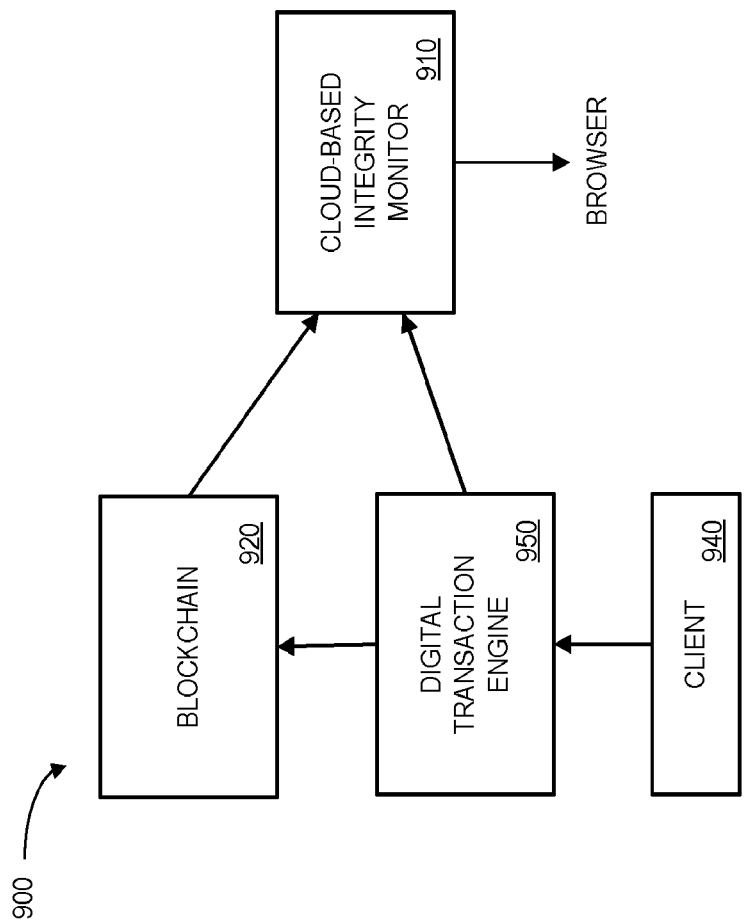
FIG. 9 is a system implementing blockchain enabled supply chain information sharing with blockchain validation according to some embodiments.
Figure 10:
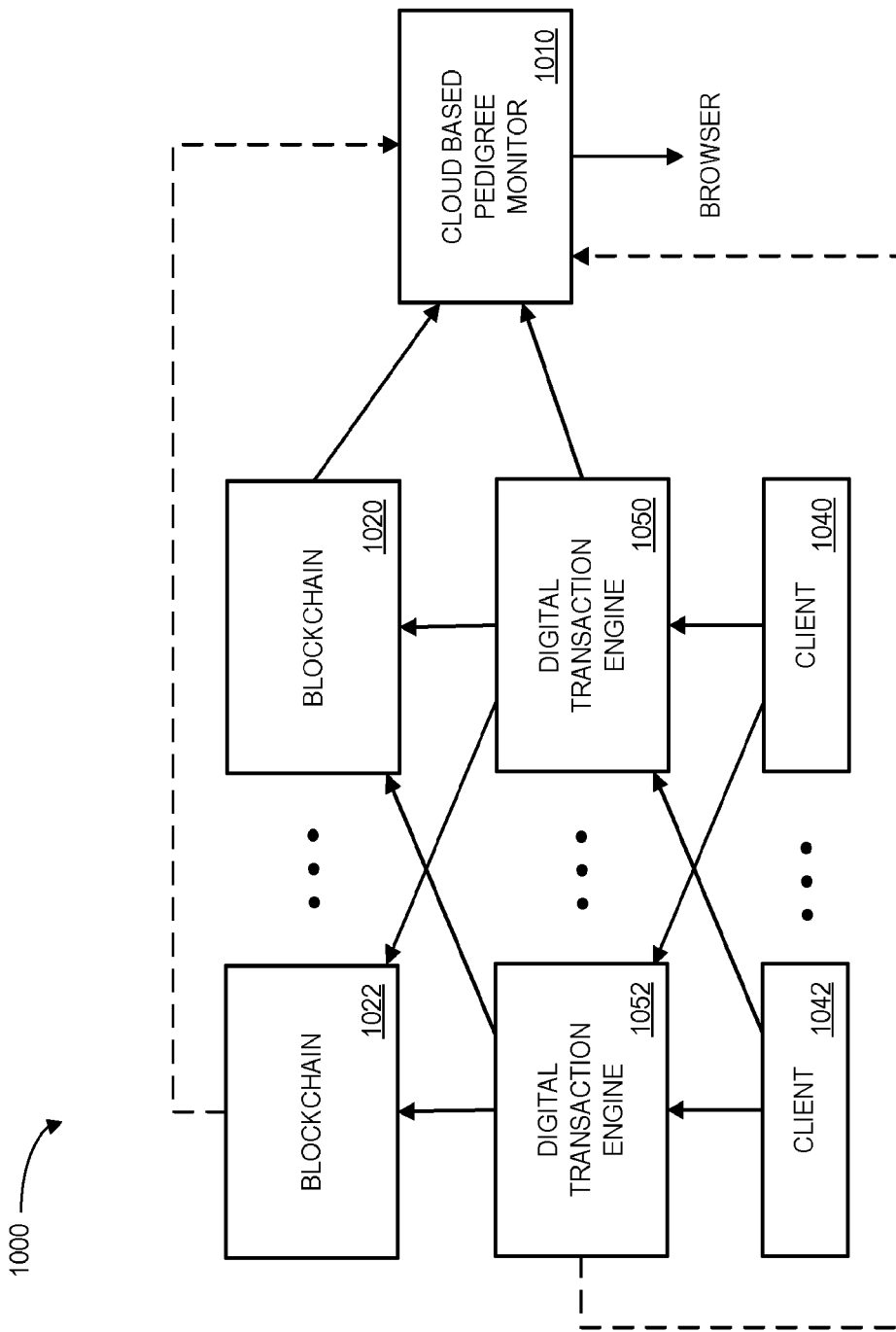
FIG. 10 is a system implementing blockchain enabled supply chain information sharing with multiple digital transaction engines in accordance with some embodiments.

FIG. 9 is a system 900 implementing supply chain information incorporating blockchain validation according to some embodiments. A cloud-based integrity monitor 910 may provide transaction integrity data via a web browser and exchange information with a blockchain 920 and a digital transaction engine 950 via Representational State Transfer ("REST") web services. The REST web services may, for example, provide interoperability between computer systems on the Internet (e.g., by allowing requesting systems to access and manipulate textual representations of web resources using a uniform, predefined set of stateless operations). According to some embodiments, portions of the digital transaction engine 950 may be associated with a MySQL or Oracle® database. In this way, the digital transaction engine 950 and blockchain 920 can be used to provide transaction level verification for a client 940. Although FIG. 9 illustrates a system 900 with a single blockchain 920 and digital transaction engine 950, note that embodiments may employ other topologies. For example, FIG. 10 is a system 1000 implementing supply chain information sharing incorporating multiple digital transaction engines in accordance with some embodiments. In particular, an additional blockchain 1022 and digital transaction engine 1052 may provide protection for an additional client 1042. As illustrated in FIG. 10, each digital transaction engine 1050, 1052 may be associated with multiple blockchains 1020, 1022 providing additional protection for the system 1000 (e.g., by storing information at multiple, geographically disperse nodes making cyber-attacks impractical). That is, each verifier (e.g., digital transaction engine) may commit a brief summary to an independent data store and, once recorded, the information cannot be changed without detection to provide a tamper-proof System of Records ("SoR").

Figure 11:
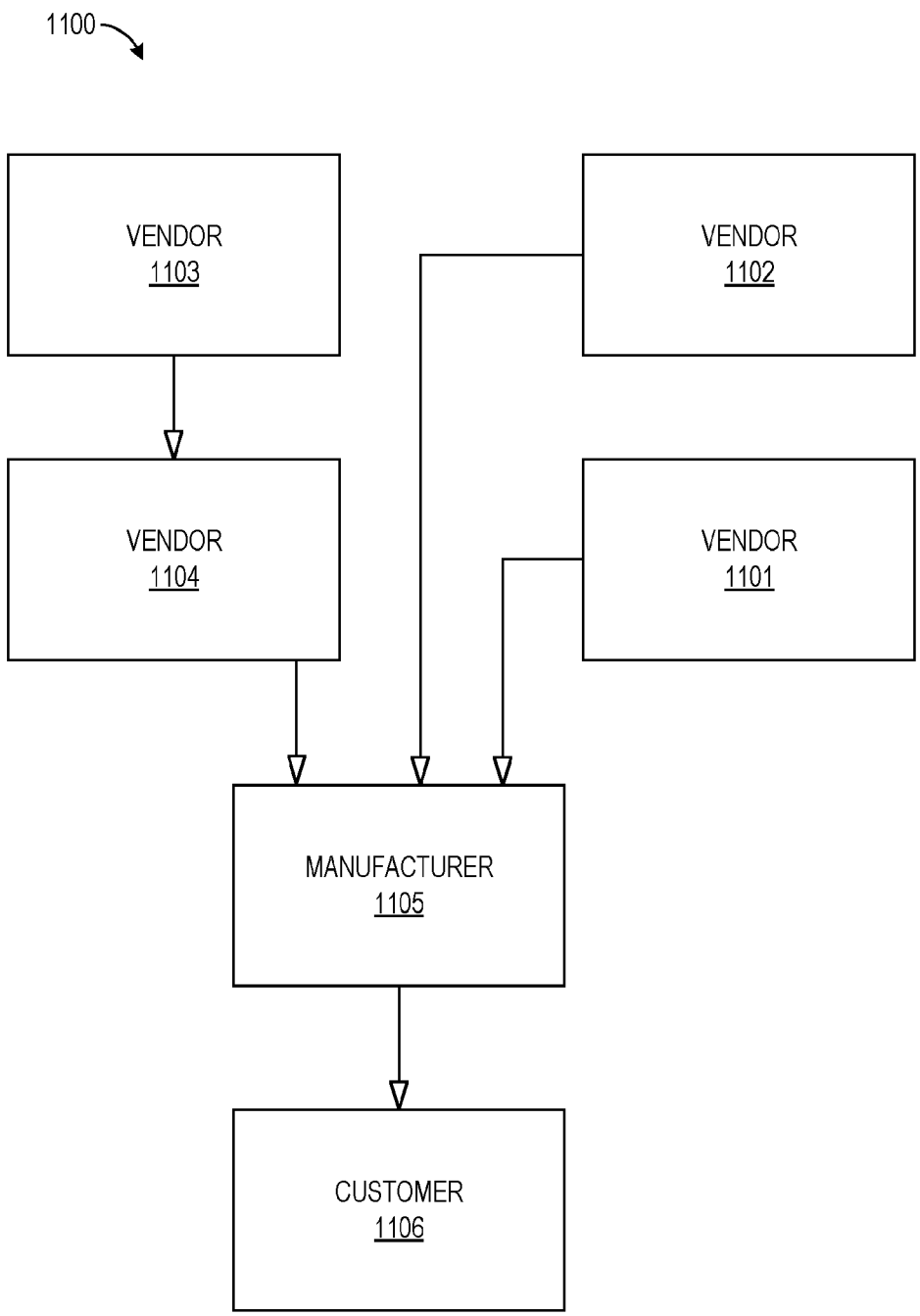
FIG. 11 is a supply chain according to some embodiments.

FIG. 11 is a supply chain 1100 according to some embodiments. The supply chain 1100 may comprise a plurality of actors such as vendor 1101, vendor 1102, vendor 1103, and vendor 1104. The vendors 1101-1104 supply material to manufacturer 1105. Manufacturer 1105 builds a product that is sold to a customer 1106. As illustrated in FIG. 11, some vendors may supply material to other vendors. For example, vendor 1103 may supply material to vendor 1104 which uses the material received from vendor 1103 to create material that is sent to the manufacturer (e.g., a chain). According to embodiments described herein, any of the system of the supply chain 1100 may exchange information with other elements of the supply chain 1100 via a trusted blockchain ledger. For example, vendor 1103 might provide the customer 1106 with an indication that the failure rate for a particular part has recently dropped by a substantial amount. As a result, the customer 1106 might request that fewer of those parts need to be delivered.

Figure 12:
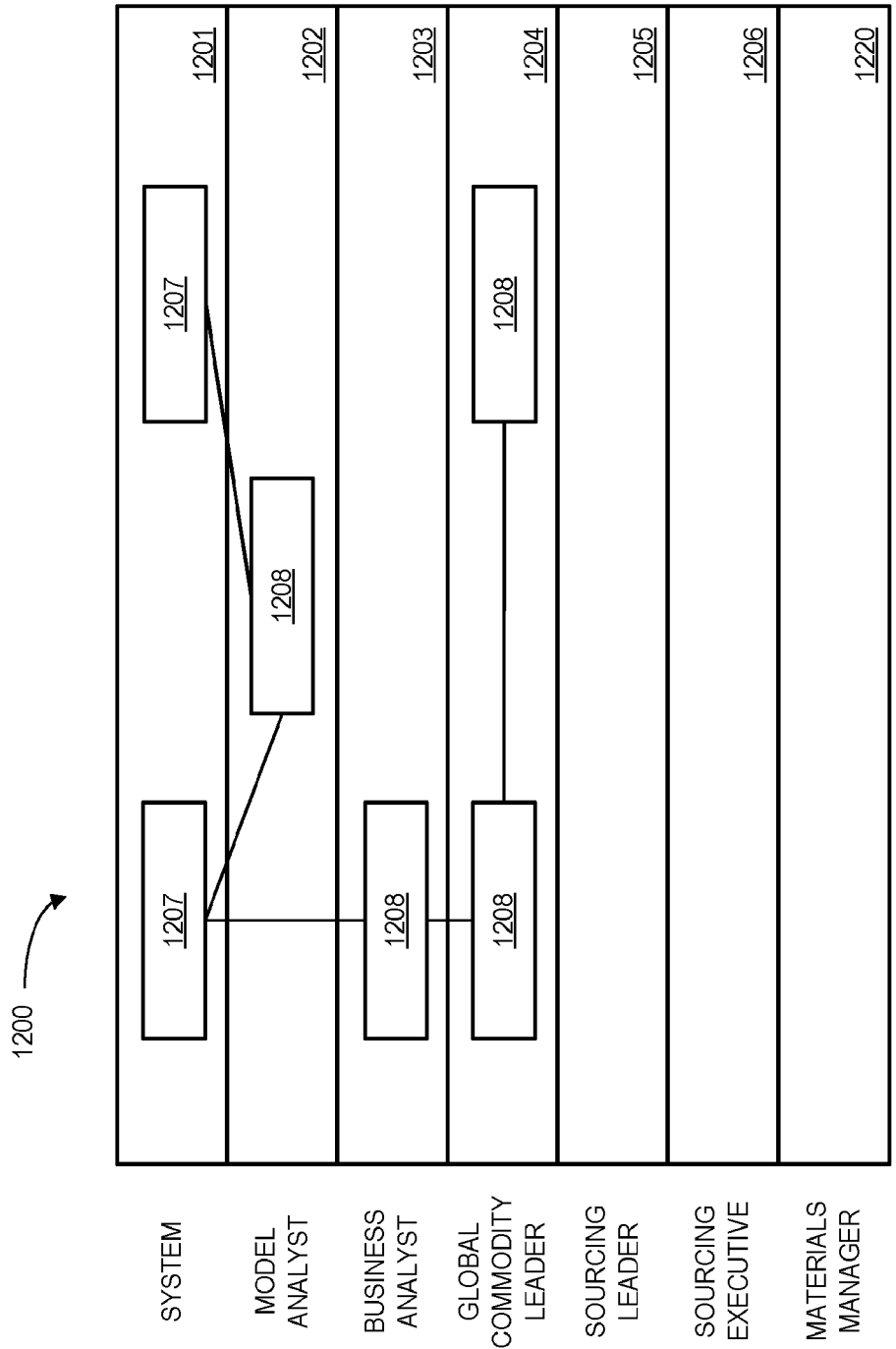
FIG. 12 illustrates a supply chain systems model in accordance with some embodiments.

The aforementioned embodiments may be used to integrate business processes, data, blockchain enabled exchanges of supply chain information, and people to create a real-time supply chain systems modeling system. A supply chain systems model may comprise a blockchain enabled exchange of supply chain information, as described previously, which is inserted into a business process model. Some advantages of the present embodiments comprise speed and accuracy over conventional systems, executive views for risk mitigation, model and data versioning, user role management, and asset utilization, logistics, LOB, inventory and/or total cost. For example, and now referring to FIG. 12, an embodiment of a supply chain systems model 1200 is illustrated. The supply chain systems model 1200 comprises both a business process model that illustrates a plurality of actor lanes 1201/1202/1203/1204/1205/1206/1220 where each actor lane 1201/1202/1203/1204/1205/1206/1220 is associated with a respective actor or entity as well as a blockchain enabled exchange of supply chain information 1207. Each actor lane 1201/1202/1203/1204/1205/1206/1220 may provide a view in which an analyst may move or reassign business process elements 1208 associated with the plurality of actors (e.g., based on information received via the blockchain ledger). In some embodiments, a business process element 1208 associated with a first actor may be moved to a lane associated with a second actor and vice versa.

Continuing with the prior example, a first actor that supplies data for blades via a blockchain ledger stops supplying data for blades and now supplies data for rotors and a second actor that supplied business rules, for example, may now supply demand data via the blockchain ledger. In this example, a supply chain systems model may be dynamically reconfigured in response to the changes associated with the actors and the system 1200 may automatically create (e.g., calculate) a new model based on new data associated with the first actor and the second actor, if it exists, as well as historical data associated with the first actor and the second actor.

Furthermore, the system 1200 may upload data from a stored location when a new model is to be created, remind the plurality of actors associated with the plurality of actor lanes 1201/1202/1203/1204/1205/1206/1220 to input data when required, and send reminders that a new supply chain systems model is available for review. By combining a business process model with blockchain enabled supply chain information sharing, the present embodiments may integrate business information to provide a dynamically reconfigurable supply chain systems model.

Figure 13:
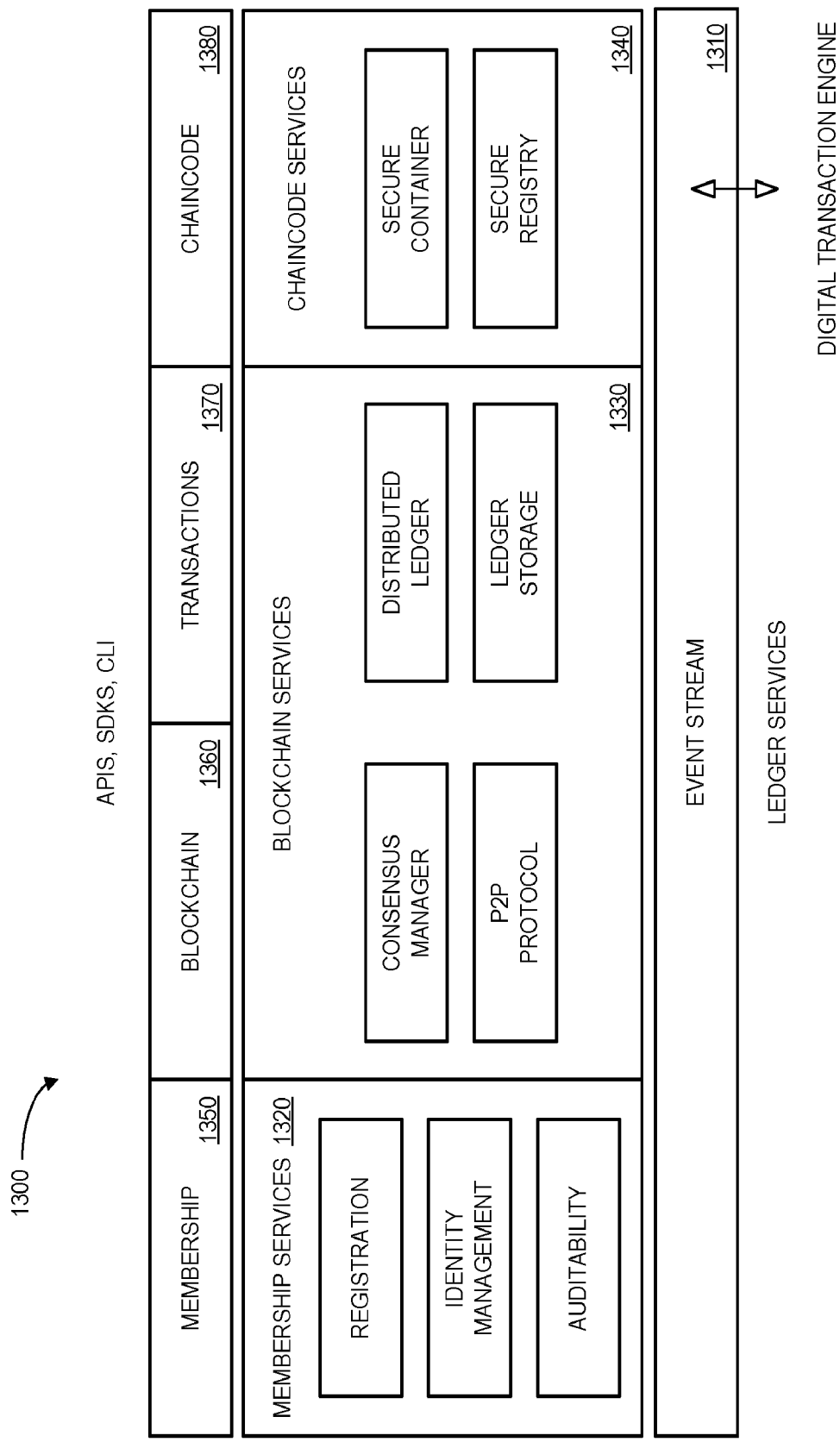
FIG. 13 is a distributed ledger reference architecture according to some embodiments.

Embodiments may be associated with any type of distributed ledger having a de-centralized consensus-based network that supports smart contracts, digital assets, record repositories, and/or cryptographic security. For example, FIG. 13 is a distributed ledger reference architecture 1300 according to some embodiments. The architecture 1300 includes ledger services and an event stream 1310 that may contain network security service information (e.g., from a first entity device). Membership services 1320 (e.g., including registration, identity managements, and/or an auditability process) may manage identity, privacy, and confidentially for membership 1350 for the network security service. Blockchain services (e.g., including a consensus manager, Peer-to-Peer ("P2P") protocol, a distributed ledger, and/or ledger storage) may manage the distributed ledger through a P2P protocol built on HTTP to maintain a single state that is replicated at many nodes to support blockchains 1360 and transactions 1370. Chaincode services (e.g., secure container and/or a secure registry associated with a smart contract) may help compartmentalize smart contract (or chaincode 1380) execution on validating nodes. Note that the environment may be a "locked down" and secured container with a set of signed base images that contain a secure OS and programming languages. Finally, APIs, Software Development Kits ("SDKs"), and/or a Command Line Interface ("CLI") may be utilized to support a network security service via the reference architecture 1300.

Thus, some embodiments described herein may use blockchain technology to provide a lower cost of development, reduce coordination costs, enable a trusted network guaranteed by blockchain, make supply chain information a type of "currency" that can be trusted, and/or provide trusted, non-reputable transaction storage (e.g., to be used in connection with an audit log).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 14:
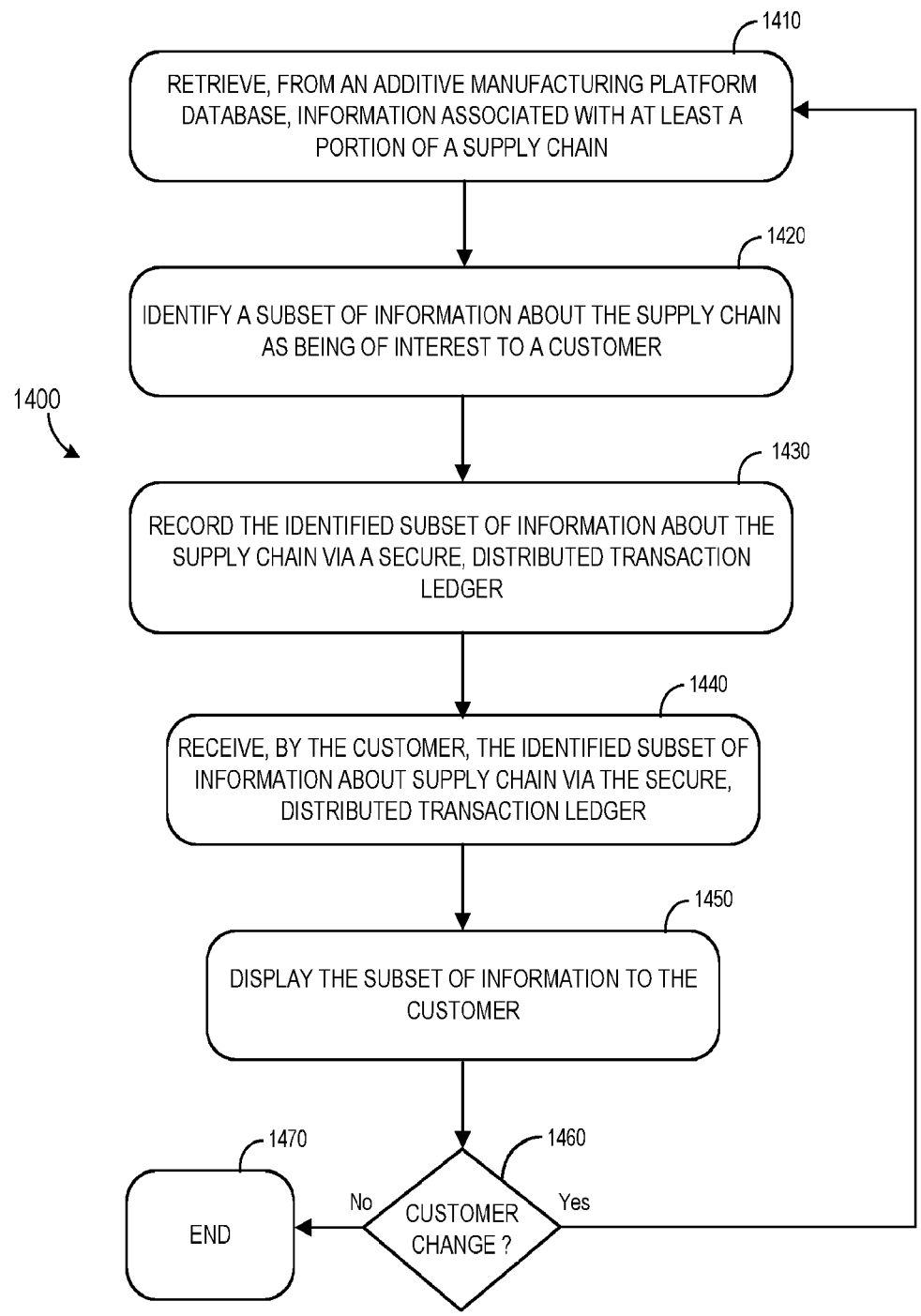
FIG. 14 is a method that may be associated with additive manufacturing and/or intellectual property in accordance with some embodiments.

Note that embodiments described herein might be associated with many different types of supply chains and/or business entities. For example, FIG. 14 is a method that may be associated with additive manufacturing in accordance with some embodiments. At 1410, information associated with at least a portion of a supply chain may be retrieved from an additive manufacturing platform database. According to some embodiments, the additive manufacturing platform utilizes an additive manufacturing printer associated with three-dimensional printing. In this case, the information about the supply chain might be associated with a printer model, a resolution, a powder, a deadline, material specifications, process conditions, etc. As used herein, the phrase "additive manufacturing" may refer to various types of three-dimensional printing, including, for example, those described in the American Society for Testing and Materials ("ASTM") group "ASTM F42—Additive Manufacturing" standards. These include vat photopolymerisation (using a vat of liquid photopolymer resin), material jetting (where material is jetted onto a build platform), binder jetting (e.g., using a powder based material and a binder), material extrusion such as Fuse Deposition Modelling ("FDM"), powder bed fusion (e.g., Direct Metal Laser Sintering ("DMLS"), Electron Beam Melting ("EBM"), etc.), a sheet lamination (including Ultrasonic Additive Manufacturing ("UAM") and Laminated Object Manufacturing ("LOM")), and Directed Energy Deposition ("DED").

At 1420, a subset of the information about the supply chain may be identified as being of interest to a customer. For example, the customer might be interested in obtaining an industrial asset item (e.g., a jet engine component) and the subset of information might be related to how much the item would cost, how it will be manufactured, available delivery options, and the like. The identified subset of information may then be recorded via a secure, distributed transaction ledger (e.g., using blockchain technology) at 1430.

The customer may then receive the identified subset of information about the supply chain vie a secure, distributed transaction ledger at 1440. The information may then be display to the customer at 1450 (e.g., via an interactive graphical user interface). If the customer does not request any changes to the data at 1460, the process ends at 1470. If, however, the customer does request one or more changes to the data at 1460 (e.g., by asking to have the industrial asset item created more quickly or in greater quantity), the information may be fed-back to the additive manufacturing platform database and the process may continue at 1410 (e.g., the entity associated with the three-dimensional printer might approve or decline the change requested by the customer).

Note that the processes described with respect to FIG. 14 might be applicable in other supply chain environments. For example, the supply chain might be associated with automobile manufacturing, consumer electronics (e.g., smartphones, tablet computers, and the like), electric power generation, etc. As another example, a producer of intellectual property (e.g., Computer Aided Design ("CAD") files describing a product, movies, songs, television shows, etc.) might identify a subset of information about a supply chain and record that information via a secure, distributed transaction ledger. A distributor or consumer of such intellectual property might then access the ledger to learn about the current or predicted future status of the supply chain.

Figure 15:
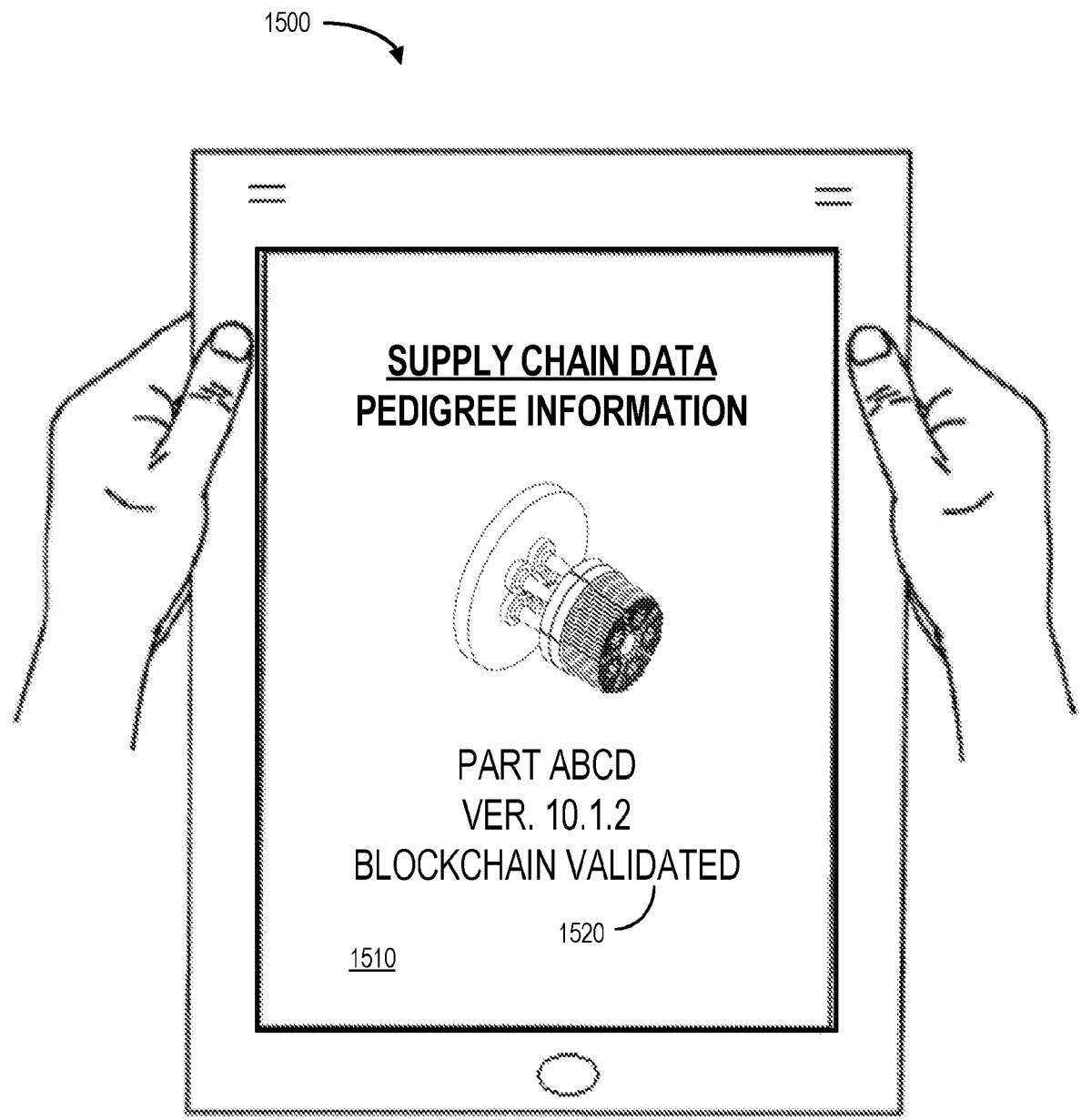
FIG. 15 illustrates a tablet computer providing a display according to some embodiments.

Although specific hardware and data configurations have been described herein, note that any number of other configurations may be provided in accordance with embodiments of the present invention (e.g., some of the information described herein may be combined or stored in external systems). Moreover, although embodiments have been described with respect to collaborative transaction information processing system, note that embodiments might be associated with other types of processing systems in general. Similarly, the displays shown and described herein are provided only as examples, and other types of displays and display devices may support any of the embodiments. For example, FIG. 15 illustrates a tablet computer 1500 with a display 1510 that might utilize an interactive graphical user interface. The display 1510 might comprise a graphical overview of the devices associated with a supply chain and/or the products that are being exchanged. Selection of an element on the display 1510 might result in further information 1520 about that element being presented (e.g., the pedigree of an industrial asset part).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to facilitate collaborative transaction processing associated with a supply chain having a first entity and a second entity of a plurality of entities, comprising:
 a model simulating a process of the supply chain based on information exchanged within the plurality of entities via a distributed computer system;
 a first entity database storing electronic records including information associated with at least a first portion of the supply chain, wherein the first entity is a manufacturer of a product associated with the supply chain;
 a first entity communication port to exchange information via the distributed computer system;
 a first entity computer processor coupled to the first entity database and the first entity communication port and adapted to:
  retrieve from the first entity database the information associated with the at least the first portion of the supply chain;
  identify a subset of information about the supply chain as being of interest to the second entity, wherein the identified subset of information comprises information about a-manufacturing and delivery associated with the product;
  record the identified subset of information about the supply chain via a secure, distributed transaction ledger;
  identify a change related to the subset of information about the supply chain based on pre-defined milestone events; and
  in response to the identified change, update the subset of information about the supply chain recorded via the secure, distributed transaction ledger to include:
   data associated with the identified change;
   validation information used to validate the data associated with the identified change, wherein the validation information comprises location data associate with the system, database information associated with the first entity database, computer information associated with the first entity computer processor; and a digital fingerprint created based on the validation information; and the first entity computer processor or a different computer processor configured to retrieve information associated with at least a second portion of the supply chain based on the identified change, wherein the information associated with the first portion and the second portion of the supply chain are used to calculate a new model simulating the process of the supply chain based on the information exchanged within the plurality of entities via the distributed computer system.

2. The system of claim 1, wherein the secure, distributed transaction ledger comprises blockchain technology.

3. The system of claim 2, wherein the blockchain ledger is: (i) controlled by a single, centralized entity, or (ii) controlled by multiple, distributed entities.

4. The system of claim 1, wherein the supply chain is associated with at least one of: (i) a local supply chain, (ii) an international supply chain, and (iii) a global supply chain.

5. The system of claim 1, wherein the identified subset of information comprises information about a quality of materials used to manufacture the product.

6. The system of claim 1, wherein the identified subset of information about the supply chain is associated with at least one of: (i) quality information, (ii) delivery information, (iii) mission critical information, (iv) physical location data, (v) product quality information, (vi) a manufacturing quality associated with the product, (vii) inspection information, (viii) a price of a good, (ix) a price of a service, (x) contractual commitment data, (xi) delivery conditions, and (xii) shipping information.

7. The system of claim 1, wherein the identified subset of information comprises a source of materials used to manufacture the product.

8. The system of claim 1, wherein the information recorded in the secure, distributed transaction ledger includes at least one of: (i) data about a specific geographic location, (ii) data about a specific database, and (iii) data about a specific computer.

9. The system of claim 1, wherein the information recorded in the secure, distributed transaction ledger includes the validation information provided by a trusted actor.

10. The system of claim 9, wherein the validation information is automatically accessed and entered into the secure, distributed transaction ledger to create the digital fingerprint.

11. The system of claim 1, further comprising:
a second entity communication port to exchange information via the distributed computer system;
a second entity computer processor coupled to the first entity communication port and adapted to:
receive the identified subset of information about the supply chain via the secure, distributed transaction ledger, and
generate a display outputting the information associated with the subset of information about the supply chain; and
a third entity communication port to exchange information via the distributed computer system, wherein the third entity communication port is coupled to the different computer processor associated with a third entity of the plurality of entities.

12. The system of claim 11, wherein the generated display is associated with at least one of: (i) a personal computer, (ii) a tablet computer, (iii) a server computer, and (iv) a smartphone.

13. The system of claim 1, wherein the product associated with the supply chain is one of: (i) an engine, (ii) an aircraft, (iii) a locomotive, (iv) power generation, and (v) a wind turbine.

14. The system of claim 1, wherein the system to facilitate collaborative transaction processing is associated with at least one of: (i) a single network cloud-hosted topology, (ii) a multiple network cloud-hosted topology, and (iii) a participant hosted intranet environment.

15. A computer-implemented method to facilitate collaborative transaction processing associated with a supply chain having a first entity and a second entity of a plurality of entities, comprising:
creating a model configured to simulate a process of the supply chain based on information exchanged within the plurality of entities via a distributed computer system;
retrieving, by a first entity computer processor from a first entity database, information associated with the at least a first portion of the supply chain, wherein the first entity is a manufacturer of a product associated with the supply chain;
identifying, by the first entity computer processor, a subset of information about the supply chain as being of interest to the second entity, wherein the identified subset of information comprises information about manufacturing and delivery associated with the product; and
recording, by the first entity computer processor, the identified subset of information about the supply chain via a secure, distributed transaction ledger;
identifying a change related to the subset of information about the supply chain based on pre-defined milestone events;
in response to the identified change, updating the subset of information about the supply chain recorded via the secure, distributed transaction ledger to include:
data associated with the identified change;
validation information used to validate the data associated with the identified change, wherein the validation information comprises location data associate with the system, database information associated with the first entity database, computer information associated with the first entity computer processor; and
a digital fingerprint created based on the validation information; and
retrieving, by the first entity computer processor or a different computer processor, information associated with at least a second portion of the supply chain based on the identified change, wherein the information associated with the first portion and the second portion of the supply chain are used to calculate a new model simulating the process of the supply chain based on the information exchanged within the plurality of entities via the distributed computer system.

16. The method of claim 15, wherein the secure, distributed transaction ledger comprises blockchain technology.

17. The method of claim 15, wherein the supply chain is associated with at least one of: (i) a local supply chain, (ii) an international supply chain, and (iii) a global supply chain.

18. The method of claim 15, wherein the first entity is associated with at least one of: (i) an Original equipment manufacturer supplier, (ii) a logistics provider, (iii) a customer, and (iv) an Original equipment manufacturer.

19. The method of claim 15, wherein the identified subset of information about the supply chain is associated with at least one of: (i) quality information, (ii) delivery information, (iii) mission critical information, (iv) physical location data, (v) product quality information, (vi) a manufacturing technique of the product, (vii) inspection information, (viii) a price of a good, (ix) a price of a service, (x) contractual commitment data, (xi) delivery conditions, and (xii) shipping information.

20. A system to facilitate collaborative transaction processing associated with a supply chain having a first entity of a plurality of entities that manufactures an industrial asset item using additive manufacturing and a second entity of the plurality of entities that is a customer or prospective customer of the industrial asset item, comprising:
 a model simulating a process of the supply chain based on information exchanged within the plurality of entities via a distributed computer system;
 a first entity device associated with the first entity and with an additive manufacturing platform capable of producing the industrial asset item, the first entity device including:
  a first entity database storing electronic records including information associated with at least a first portion of the supply chain;
  a first entity communication port to exchange information via a distributed computer system; and
  a first entity computer processor coupled to the first entity database and the first entity communication port and adapted to:
   retrieve from the first entity database the information associated with the at least the first portion of the supply chain;
   identify a subset of information about the supply chain as being of interest to the second entity, the subset of information pertaining to the additive manufacturing and delivery of the industrial asset item;
   record the identified subset of information about the supply chain via a secure, distributed transaction ledger;
   identify a change related to the subset of information about the supply chain based on pre-defined milestone events; and
   in response to the identified change, update the subset of information about the supply chain recorded via the secure, distributed transaction ledger to include:
    data associated with the identified change;
    validation information used to validate the data associated with the identified change, wherein the validation information comprises location data associate with the system, database information associated with the first entity database, computer information associated with the first entity computer processor; and
    a digital fingerprint created based on the validation information;
 a second entity device associated with the second entity, the second entity device including:
  a second entity communication port to exchange information via the distributed computer system; and
  a second entity computer processor coupled to the first entity communication port and adapted to:
   receive the identified subset of information pertaining to the additive manufacturing of the industrial asset item via the secure, distributed transaction ledger; and
   generate a display outputting the identified subset of information pertaining to the additive manufacturing of the industrial asset item and
 the first entity computer processor or a different computer processor configured to retrieve information associated with at least a second portion of the supply chain based on the identified change, wherein the information associated with the first portion and the second portion of the supply chain are used to calculate a new model simulating the process of the supply chain based on the information exchanged within the plurality of entities via the distributed computer system.

21. The system of claim 20, wherein the secure, distributed transaction ledger comprises blockchain technology.

* * * * *